(12) United States Patent
Iijima et al.

(10) Patent No.: US 9,091,534 B2
(45) Date of Patent: Jul. 28, 2015

(54) MEASURING APPARATUS, MEASURING METHOD, AND METHOD OF MANUFACTURING AN OPTICAL COMPONENT

(71) Applicant: CANON KABUSHIKI KAISHA, Tokyo (JP)

(72) Inventors: Hitoshi Iijima, Utsunomiya (JP); Atsushi Maeda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 13/795,998

(22) Filed: Mar. 12, 2013

(65) Prior Publication Data

US 2013/0250099 A1   Sep. 26, 2013

(30) Foreign Application Priority Data

Mar. 26, 2012   (JP) .................. 2012-069563

(51) Int. Cl.
| | |
|---|---|
| H04N 7/18 | (2006.01) |
| A61B 3/14 | (2006.01) |
| G01B 9/02 | (2006.01) |
| G01B 11/24 | (2006.01) |
| G01M 11/02 | (2006.01) |
| G01J 9/00 | (2006.01) |
| G01J 9/02 | (2006.01) |

(52) U.S. Cl.
CPC .......... *G01B 11/2441* (2013.01); *G01B 9/0209* (2013.01); *G01B 9/02027* (2013.01);
(Continued)

(58) Field of Classification Search
CPC .......... G01B 2290/70; G01B 9/02088; G01B 11/2441; G01J 2009/002; G01S 17/89; H04N 5/2256; A63B 2243/0045

USPC .......... 348/136; 351/206, 246; 356/450, 479, 356/518
See application file for complete search history.

(56) References Cited

U.S. PATENT DOCUMENTS

| | | | |
|---|---|---|---|
| 6,750,958 B1 | 6/2004 | Fantone et al. | |
| 2006/0250618 A1* | 11/2006 | Kawasaki et al. | 356/512 |

(Continued)

FOREIGN PATENT DOCUMENTS

JP   2003-322587   11/2003

OTHER PUBLICATIONS

Simon Tuohy et al., "Depth-resolved wavefront aberrations using a coherence-gated Shack-Hartmann wavefront sensor", Feb. 15, 2010, vol. 18, No. 4, Optics Express, 3458-3476.

(Continued)

*Primary Examiner* — Dave Czekaj
*Assistant Examiner* — Tsion B Owens
(74) *Attorney, Agent, or Firm* — Fitzpatrick, Cella, Harper & Scinto

(57) ABSTRACT

To eliminate influence of undesirable light component from an object when measuring optical characteristics such as shape and wavefront aberration of the object, light from light source (101) is separated by polarization beam splitter (103) into measuring light (L1) that irradiates and travels via the object (108) and is condensed on image plane (P) through microlenses (114a) of microlens array (114), and reference light (L2) that does not irradiate the object and is guided to the image plane by reference light optical system (109). A computer (113) acquires picked-up images sequentially from CCD image sensor (116) arranged on the image plane while changing optical path length of the reference light by movable stage (117), extracts interference light spots generated through interference between signal light component and the reference light from the picked-up images, calculates positions of the interference light spots, and calculates deviation amounts of positions from predetermined reference positions.

6 Claims, 9 Drawing Sheets

(52) U.S. Cl.
CPC ........ *G01B9/02039* (2013.01); *G01B 9/02088* (2013.01); *G01M 11/025* (2013.01); *G01M 11/0271* (2013.01); *G01B 2290/70* (2013.01); *G01J 2009/002* (2013.01); *G01J 2009/0203* (2013.01); *Y10T 29/49826* (2015.01)

(56) References Cited

U.S. PATENT DOCUMENTS

| | | |
|---|---|---|
| 2007/0236701 A1 | 10/2007 | Neal et al. |
| 2011/0222070 A1* | 9/2011 | Nagai et al. ............ 356/496 |

OTHER PUBLICATIONS

Jingyu Wang et al., "Time-doman coherence gated Shack-Hartmann wavefront sensor", Proceedings of SPIE, vol. 8091, Jun. 1, 2011, pp. 80911L-1-80911L-6.

European Patent Office Search Report in 13159880.7, dated Jul. 3, 2013.

\* cited by examiner

MEASURING APPARATUS, MEASURING METHOD, AND METHOD OF MANUFACTURING AN OPTICAL COMPONENT

BACKGROUND OF THE INVENTION

1. Field of the Invention

The present invention relates to a measuring apparatus and a measuring method to be employed for measuring a surface shape and a wavefront aberration of an object to be measured through use of light, and to a method of manufacturing an optical component by employing the measuring method.

2. Description of the Related Art

Conventionally, a measuring method using light has generally been employed for highly accurate measurement of a shape of an optical component and a wavefront aberration thereof. In a process of obtaining a highly accurate shape and an aspheric shape, it is necessary to measure the shape of the optical element, determine a difference from a designed shape, and to perform a correction process using data thus obtained. In recent years, there has been such a tendency that the accuracy of the shape increases and the aspheric amount of the aspheric optical element increases. Further, a free-form surface optical element has been used as well. As a measuring method for a surface shape and a wavefront aberration of such optical elements, a Shack-Hartmann method has been known (see U.S. Pat. No. 6,750,958 and Japanese Patent Application Laid-Open No. 2003-322587).

FIG. 12 is an explanatory view illustrating a schematic configuration of a surface shape measuring apparatus as an example of a conventional measuring apparatus. In FIG. 12, light emitted from a light source 1 is collimated. The collimated light having a plane wave 2 is deflected on a beam splitter 3, and enters an objective lens 4. The incident light having the plane wave 2 is condensed by the objective lens 4 into light having a spherical wave 5. The light having the spherical wave 5 passes through an aperture 6, and is reflected on a surface 7 to be measured. The light reflected on the surface 7 to be measured passes again through the aperture 6 and the objective lens 4 in a sequential manner, and is converted into light having a plane wave.

When the shape of the surface 7 to be measured deviates from a shape of a spherical surface, however, the wavefront of the light passing through the objective lens 4 becomes a wavefront 9 that deviates from the plane wavefront due to the difference from the spherical surface. The light having the wavefront 9 passes through the beam splitter 3, and is condensed by a microlens array 10. The condensed light is then detected as light spots by an image pickup element 11 such as a CCD image sensor.

A picked-up image, which is generated by the image pickup element 11 and contains positional information of the light spots, is received by a computer 13 via a frame grabber 12. The computer 13 extracts the light spots from the received picked-up image containing the light spots as an optical image, and calculates barycenter positions of the respective light spots.

The computer 13 compares the calculated barycenter positions of the light spots to reference positions of light spots, which are acquired in advance through use of a reference spherical wave. Then, the computer 13 determines a shape difference between the shape of the surface 7 to be measured and the shape of the reference spherical wave based on the movement amounts (deviation amounts) of the barycenter positions of the light spots from the reference positions. The movement amount of a single light spot corresponds to a difference between an inclination of the reference spherical wave and an inclination of a region of the surface 7 to be measured, which corresponds to a light spot obtained by condensing light through a single microlens. Thus, the shape error of the entire surface 7 to be measured from the spherical surface can be determined through integration over the whole microlenses.

Note that, when measuring a wavefront aberration of the object to be measured, the object to be measured is irradiated with light, and the light passing therethrough is condensed by the microlens array. Then, the positions of the light spots are detected, and the wavefront aberration of the object to be measured is determined based on the deviation amounts of the detected positions of the light spots from the reference positions.

In the case of measuring the surface shape of the object to be measured by employing the above-mentioned Shack-Hartmann method disclosed in U.S. Pat. No. 6,750,958 and Japanese Patent Application Laid-Open No. 2003-322587, however, when the object to be measured is made of a substance which allows measuring light to pass therethrough as in the case of a lens, light reflected from a rear surface of the object to be measured (undesirable light component) is generated in addition to the light reflected from the surface to be measured (signal light component). In the example of FIG. 12, light reflected from a rear surface 8 of the object to be measured is the undesirable light component. Further, in the case of measuring the wavefront aberration of the object to be measured by employing the above-mentioned Shack-Hartmann method disclosed in U.S. Pat. No. 6,750,958 and Japanese Patent Application Laid-Open No. 2003-322587, multiple reflected light resulting from multiple reflection occurring inside the object to be measured (undesirable light component) is generated in addition to the light passing directly through the object to be measured (signal light component).

When those signal light component and undesirable light component pass through the microlens array, signal light spots and undesirable light spots are formed on the image pickup element. Therefore, in the case where the computer calculates the deviation amounts of the signal light spots from the reference positions based on the acquired picked-up image, there is a problem in that the undesirable light spots overlap with the signal light spots and the accuracy of the position detection is therefore deteriorated.

SUMMARY OF THE INVENTION

In view of the above, the present invention provides a measuring apparatus and a measuring method to measure optical characteristics such as a surface shape and a wavefront aberration of an object to be measured with high accuracy while eliminating influence of an undesirable light component.

According to an exemplary embodiment of the present invention, there is provided a measuring apparatus, including: a light source for emitting light having a coherence length smaller than an optical path difference between light entering a first optical surface of an object to be measured and light entering a second optical surface of the object to be measured; a separating optical system for separating the light emitted from the light source into measuring light that irradiates the object to be measured and reference light that does not irradiate the object to be measured; a lens array formed of a plurality of lenses, for condensing, on an image plane, each of the reference light and the measuring light that travels via the object to be measured; an image pickup element arranged on the image plane; an adjusting unit for changing at least one object to be adjusted among an optical path length of the measuring light that travels from the light source to the lens array, an optical path length of the reference light that travels from the light source to the lens array, and a wavelength width of the light source, the adjusting unit being configured to change the at least one object to be adjusted so as to include a range in which a signal light component contained in the measuring light that travels via the object to be measured interferes with the reference light; and a calculating unit for extracting interference light spots generated through interference between the signal light component and the reference light from a plurality of picked-up images acquired sequentially from the image pickup element while changing, by the adjusting unit, the at least one object to be adjusted, calculating positions of the interference light spots, and calculating a shape of the object to be measured based on the positions of the interference light spots and predetermined reference positions.

Further, according to an exemplary embodiment of the present invention, there is provided a measuring method using a measuring apparatus, the measuring apparatus including: a light source for emitting light having a coherence length smaller than an optical path difference between light entering a first optical surface of an object to be measured and light entering a second optical surface of the object to be measured; a separating optical system for separating the light emitted from the light source into reference light and measuring light that irradiates the object to be measured; a lens array formed of a plurality of lenses, for condensing, on an image plane, each of the reference light and the measuring light that travels via the object to be measured; and an image pickup element arranged on the image plane, the measuring method including: an adjusting process of changing at least one object to be adjusted among an optical path length of the measuring light that travels from the light source to the lens array, an optical path length of the reference light that travels from the light source to the lens array, and a wavelength width of the light source, the at least one object to be adjusted being changed so as to include a range in which a signal light component contained in the measuring light that travels via the object to be measured interferes with the reference light; an image pickup process of acquiring a plurality of picked-up images sequentially from the image pickup element while changing the at least one object to be adjusted in the adjusting process; an extracting process of extracting interference light spots generated through interference between the signal light component and the reference light from the plurality of picked-up images; and a calculating process of calculating positions of the interference light spots, and calculating a shape of the object to be measured based on the positions of the interference light spots and predetermined reference positions.

According to the present invention, the interference light spots obtained through the interference between the reference light and the signal light component contained in the measuring light, which travels via the object to be measured, have a higher light intensity than the light spots of the signal light component. Thus, the distinction from the undesirable light spots is facilitated so that the interference light spots can be extracted easily. As a result, the barycenter positions of the interference light spots can be determined with high accuracy, and the deviation amounts of the barycenter positions can be determined with high accuracy. Accordingly, the optical characteristics such as the surface shape and the wavefront aberration of the object to be measured can be measured with high accuracy.

Further features of the present invention will become apparent from the following description of exemplary embodiments with reference to the attached drawings.

DESCRIPTION OF THE EMBODIMENTS

In the following, exemplary embodiments of the present invention are described in detail with reference to the attached drawings.

First Embodiment

Figure 1A:
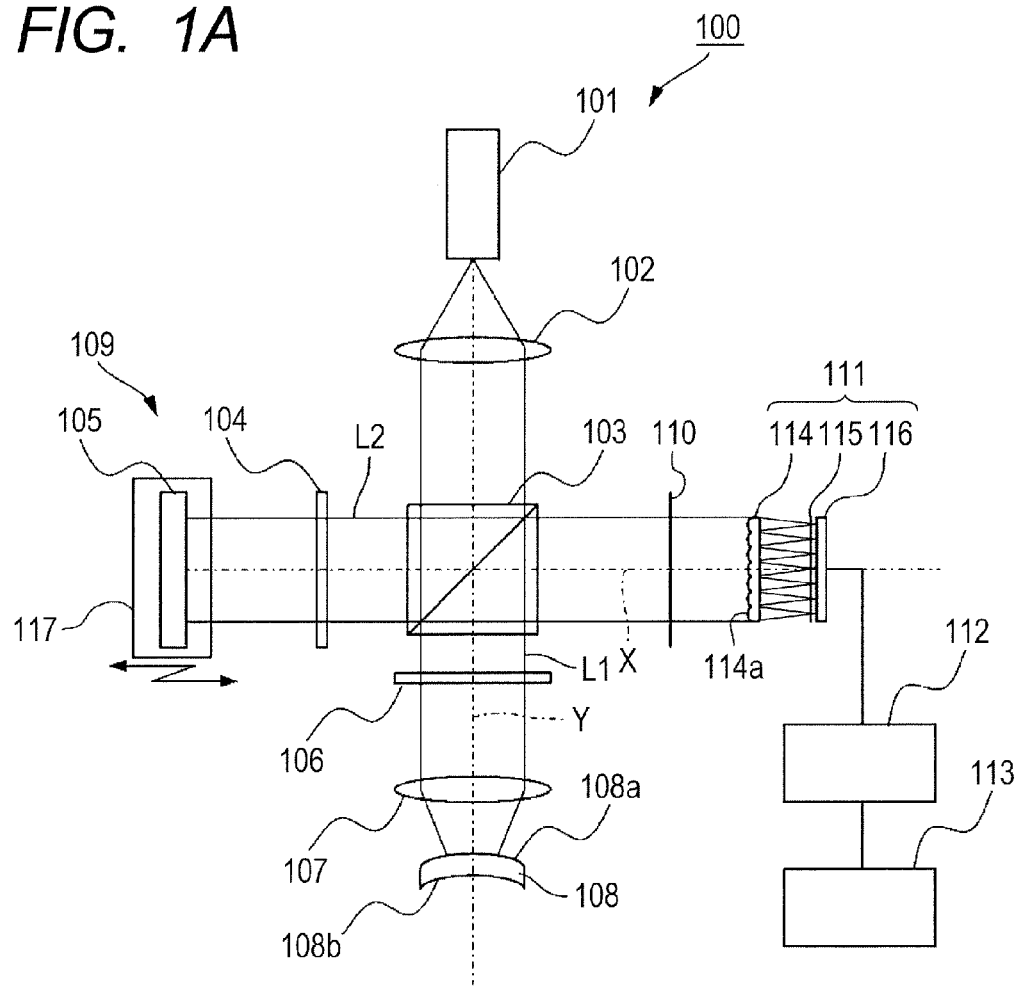
FIG. 1A is an explanatory view illustrating a schematic configuration of a surface shape measuring apparatus as an example of a measuring apparatus according to a first embodiment of the present invention.
Figure 1B:
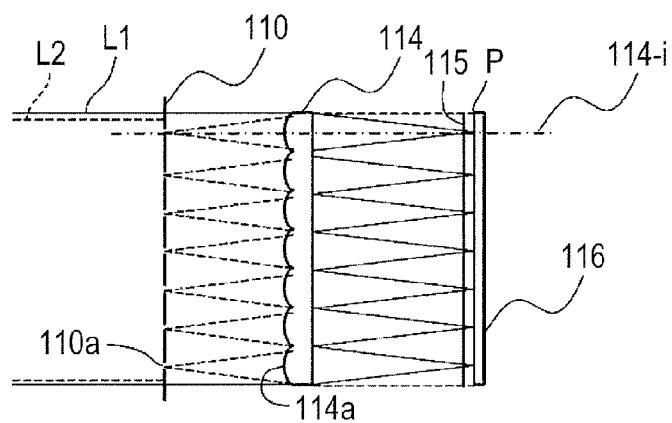
FIG. 1B is an enlarged view illustrating the vicinity of a Shack-Hartmann sensor of the measuring apparatus according to the first embodiment of the present invention.

FIG. 1A is an explanatory view illustrating a schematic configuration of a surface shape measuring apparatus as an example of a measuring apparatus according to a first embodiment of the present invention. FIG. 1B is an enlarged view illustrating the vicinity of a Shack-Hartmann sensor. A surface shape measuring apparatus 100 is configured to measure a shape of a front surface 108a of an object 108 to be measured, and the object 108 to be measured is a transparent optical component such as a lens. The optical component has a front surface and a rear surface, which may sometimes be referred to as "first optical surface" and "second optical surface", respectively.

As illustrated in FIG. 1A, the surface shape measuring apparatus 100 includes a light source 101, a collimator lens 102, a polarization beam splitter 103 serving as a separating optical system, a quarter wavelength plate 104, a reference mirror 105 serving as a reflection member, a quarter wavelength plate 106, and a lens 107. Further, the surface shape measuring apparatus 100 includes a linear polarization plate 110, a Shack-Hartmann sensor 111, a frame grabber 112, and a computer 113 serving as a calculating unit. Still further, in the first embodiment, the surface shape measuring apparatus 100 includes a movable stage 117 serving as an adjusting unit.

The Shack-Hartmann sensor 111 includes a microlens array 114 formed of a plurality of microlenses 114a, which serves as a lens array formed of a plurality of lenses, a linear polarizing element 115, and a CCD image sensor 116 serving as an image pickup element.

The light source 101 is a light source for emitting light having a wavelength width set so that a coherence length becomes smaller than an optical path difference between an optical path length (optical distance) of a signal light component and an optical path length (optical distance) of an undesirable light component, which are contained in measuring light L1. In the first embodiment, a measurement target is the light reflected from the front surface (surface to be measured) 108a of the object 108 to be measured, and a removal target is the light reflected from a rear surface 108b of the object 108 to be measured. Thus, in the first embodiment, the light source 101 is a light source for emitting light having a wavelength width set so that the coherence length becomes smaller than the minimum distance between the front surface 108a and the rear surface 108b of the object 108 to be measured. As the light source 101, for example, a super luminescent diode or a wavelength width changeable light source may be used, but the present invention is not limited thereto. In the case of a super luminescent diode, the coherence length is about 30 μm, and is thus smaller than the minimum distance between the front surface and the rear surface of a general lens.

On an optical axis Y of the light source 101, the collimator lens 102, the polarization beam splitter 103, the quarter wavelength plate 106, the lens 107, and the object 108 to be measured are arranged sequentially in a traveling direction of the light emitted from the light source 101. Further, on an optical axis X, which is orthogonal to the optical axis Y of the light source 101 and passes through the polarization beam splitter 103, the quarter wavelength plate 104 and the reference mirror 105 are arranged sequentially in a direction away from the polarization beam splitter 103. Still further, on a side opposite to the reference mirror 105 across the polarization beam splitter 103, the linear polarization plate 110, the microlens array 114, the linear polarizing element 115, and the CCD image sensor 116 are arranged sequentially in a direction away from the polarization beam splitter 103.

The collimator lens 102 converts the light emitted from the light source 101 into collimated light. The polarization beam splitter 103 separates the light, which is emitted from the light source 101 and converted into the collimated light by passing through the collimator lens 102, into the measuring light L1 (p-polarized light) and reference light L2 (s-polarized light), which have polarizing planes orthogonal to each other. Specifically, the polarization beam splitter 103 causes linearly polarized light as the p-polarized light to pass (travel straight) therethrough, and reflects linearly polarized light as the s-polarized light at an angle of 90°. Thus, the polarization beam splitter 103 causes the measuring light L1 as the p-polarized light to pass therethrough toward the quarter wavelength plate 106, and reflects the reference light L2 as the s-polarized light at an angle of 90° toward the quarter wavelength plate 104.

The reference mirror 105 perpendicularly inputs and reflects the reference light L2 obtained through the separation by the polarization beam splitter 103, to thereby return the reference light L2 to the polarization beam splitter 103. The quarter wavelength plate 104 rotates, at an angle of 90°, the polarizing plane of the reference light L2 that travels back and forth between the polarization beam splitter 103 and the reference mirror 105. Specifically, the quarter wavelength plate 104 converts the reference light L2, which travels back and forth, from the s-polarized light into the p-polarized light. Thus, the reference light L2 that travels back and forth between the polarization beam splitter 103 and the reference mirror 105 passes through the quarter wavelength plate 104 twice, and hence becomes the p-polarized light, thereby passing (traveling straight) through the polarization beam splitter 103 to reach the linear polarization plate 110.

The lens 107 converts the incident collimated light into light having a spherical wave, and converts the incident light having the spherical wave into collimated light. Specifically, the lens 107 converts the incident measuring light L1 in the form of collimated light into light having a spherical wave, and irradiates the object 108 to be measured with the light having the spherical wave. Then, the lens 107 converts the measuring light L1, which is reflected on the surface 108a to be measured and the rear surface 108b of the object 108 to be measured, into substantially collimated light.

The quarter wavelength plate 106 rotates, at an angle of 90°, the polarizing plane of the measuring light L1 that travels back and forth between the polarization beam splitter 103 and the object 108 to be measured. Specifically, the quarter wavelength plate 106 converts the measuring light L1, which travels back and forth, from the p-polarized light into the s-polarized light. Thus, the measuring light L1 that travels back and forth between the polarization beam splitter 103 and the object 108 to be measured passes through the quarter wavelength plate 106 twice, and hence becomes the s-polarized light, thereby being reflected on the polarization beam splitter 103 at an angle of 90° to reach the linear polarization plate 110.

The linear polarization plate 110 is arranged on a light incident side of the microlens array 114 so that a polarizing direction thereof becomes orthogonal to the polarizing direction of the p-polarized light (reference light L2) and parallel to the polarizing direction of the s-polarized light (measuring light L1). Thus, the measuring light L1 passes through the linear polarization plate 110.

As illustrated in FIG. 1B, the linear polarization plate 110 includes a plurality of pinholes 110a formed in a linear polarization plate main body at positions corresponding to the respective microlenses 114a of the microlens array 114. The number of the pinholes 110a is equal to the number of the microlenses 114a. Further, the pinholes 110a are arranged on optical axes 114-i of the microlens array 114, respectively.

Further, the linear polarization plate 110 is arranged so that the pinholes 110a of the linear polarization plate 110 are located at positions corresponding to focal lengths of the microlenses 114a of the microlens array 114, respectively. The reference light L2 as the p-polarized light that enters the linear polarization plate 110 is blocked by the linear polarization plate (main body) 110, but diffracted light of the reference light L2 irradiate the microlenses 114a of the microlens array 114 through the respective pinholes 110a.

The microlens array 114 has the plurality of microlenses 114a formed and arranged on a plane in a grid pattern (in an array). The microlens array 114 condenses the incident measuring light L1 in the form of collimated light on an image plane P through the respective microlenses 114a to form light spots. The CCD image sensor 116 is arranged on the image plane P.

Further, the microlenses 114a of the microlens array 114 convert the diffracted light passing through the respective pinholes 110a into substantially collimated light. Accordingly, the microlens array 114 irradiates the entire image pickup plane of the CCD image sensor 116 with the reference light L2.

The linear polarizing element 115 is a polarizing member for aligning the polarizing planes of the measuring light L1 and the reference light L2, and is arranged so that a polarizing direction thereof becomes 45° with respect to the polarizing directions of the measuring light L1 and the reference light L2.

In the first embodiment, the quarter wavelength plate 104, the reference mirror 105, and the linear polarization plate 110 constitute a reference light optical system 109 for guiding, to the image plane P, the reference light L2 obtained through the separation by the polarization beam splitter 103.

The CCD image sensor 116 is an image pickup element arranged on the image plane P, and outputs electric signals of images picked up based on the light received on the image pickup plane. The frame grabber 112 receives the picked-up images from the CCD image sensor 116, and outputs data on the respective picked-up images to the computer 113 serving as the calculating unit. The computer 113 acquires the data on the plurality of picked-up images from the CCD image sensor 116 via the frame grabber 112, and executes various kinds of arithmetic processing on the acquired data.

The reference mirror 105 is fixed to the movable stage 117 serving as the adjusting unit. Under control of the computer 113, the movable stage 117 moves the reference mirror 105 in a direction parallel to the direction of the optical axis X. Accordingly, the optical path length of the reference light L2 that travels from the light source 101 via the reference mirror 105 to reach the microlens array 114 can be changed. That is, in the first embodiment, the optical path length of the reference light L2 that travels from the light source 101 to reach the microlens array 114 is defined as an object to be adjusted. The movable stage 117 moves the reference mirror 105 in accordance with an instruction from the computer 113, and thus the optical path length of the reference light L2 can be changed.

Next, the case where light is emitted from the light source 101 is described. The light emitted from the light source 101 is converted into collimated light by the collimator lens 102, and the polarization beam splitter 103 separates the collimated light into the measuring light L1 as the p-polarized light and the reference light L2 as the s-polarized light.

The reference light L2 is deflected on the polarization beam splitter 103 at an angle of 90°, and is converted into circularly polarized light by the quarter wavelength plate 104. Then, the circularly polarized light is reflected on the reference mirror 105. The reference light L2 reflected on the reference mirror 105 passes through the quarter wavelength plate 104 again, and is thus converted into linearly polarized light having a polarizing direction rotated at an angle of 90° with respect to the polarizing direction at the time of entrance, that is, p-polarized light. The p-polarized light passes through the polarization beam splitter 103.

On the other hand, the measuring light L1 passing through the polarization beam splitter 103 is converted into circularly polarized light by the quarter wavelength plate 106, and is further converted into light having a spherical wave by the lens 107. The light having the spherical wave is reflected on the surface 108a to be measured and the rear surface 108b.

The measuring light L1 reflected on the surface 108a to be measured and the rear surface 108b passes through the lens 107 and the quarter wavelength plate 106 again, and is thus converted into linearly polarized light having a polarizing direction different by an angle of 90° from the polarizing direction at the time of entrance, that is, s-polarized light. The s-polarized light is reflected on the polarization beam splitter 103.

The measuring light L1 herein refers to light that irradiates the object 108 to be measured (light that travels via the object 108 to be measured), and the reference light L2 herein refers to light that does not irradiate the object 108 to be measured (light that does not travel via the object 108 to be measured).

The reference light L2 reflected on the reference mirror 105 and the measuring light L1 that travels via the object 108 to be measured (that is, reflected on the surface 108a to be measured and the rear surface 108b) enter the linear polarization plate 110.

The reference light L2 and the measuring light L1 that enter the linear polarization plate 110 have their polarizing directions orthogonal to each other. Specifically, the reference light L2 that enters the linear polarization plate 110 is the p-polarized light, whereas the measuring light L1 that enters the linear polarization plate 110 is the s-polarized light. The linear polarization plate 110 is installed so that the polarizing direction (transmission axis direction) of the linear polarization plate 110 matches with the polarizing direction of the measuring light L1, and hence the measuring light L1 that enters the linear polarization plate 110 passes through the linear polarization plate 110. Then, the measuring light L1 passing through the linear polarization plate 110 is condensed by the respective microlenses 114a of the microlens array 114 so that a light spot group (plurality of light spots) is formed on the CCD image sensor 116.

On the other hand, the reference light L2 that enters the linear polarization plate 110 has its polarizing direction orthogonal to the polarizing direction (transmission axis direction) of the linear polarization plate 110, and hence the reference light L2 does not pass through the linear polarization plate 110 but is diffracted through the respective pinholes 110a of the linear polarization plate 110. Then, the reference light L2 diffracted on the linear polarization plate 110 is converted into substantially collimated light by the microlens array 114, and enters the CCD image sensor 116.

In this case, the linear polarizing element 115 having its polarizing direction set at an angle of 45° with respect to the polarizing directions of the measuring light L1 and the reference light L2 is provided between the microlens array 114 and the CCD image sensor 116. Accordingly, the measuring light L1 and the reference light L2 pass through the linear polarizing element 115 with their polarizing directions aligned.

The picked-up image, which is obtained by the CCD image sensor 116 and contains the light spot group, is received by the computer 113 via the frame grabber 112. The computer 113 determines barycenters of light intensities of the respective light spots, to thereby calculate barycenter positions of the light spots.

When the wavefront of the measuring light L1 that enters the Shack-Hartmann sensor 111 is a plane (plane wave), the barycenter positions of the light spots are located on the optical axes 114-$i$ ("i" represents a serial number of the microlens) of the microlenses 114a, respectively.

The surface 108a to be measured and the microlens array 114 are arranged in a conjugate manner. Thus, one element (microlens 114a) of the microlens array 114 corresponds to one of a plurality of divided regions of the surface 108a to be measured.

When one region of the surface 108a to be measured has any difference from a spherical wave, the position of the light spot obtained through the microlens 114a corresponding to the one region deviates from a reference position depending on a mean value of the differences from the spherical wave in the one region.

The reference position is acquired by the computer 113 as calibration data indicating a specific position of a reference light spot on the CCD image sensor 116, the reference light spot being obtained in advance through use of a reference plane wave. That is, the computer 113 prestores the reference positions of the respective light spots in a storage unit (not shown).

The computer 113 compares the reference positions of the light spots obtained through use of the reference plane wave to the positions of the light spots obtained through the reflection of light from the surface 108a to be measured, and determines the wavefront aberration of the incident light, to thereby calculate a shape error of the surface 108a to be measured from the reference. The movement amount of a single light spot corresponds to a difference between an inclination of the spherical wave and an inclination of one region of the surface 108a to be measured, which corresponds to a light spot obtained by condensing light through a single microlens 114a. The computer 113 determines the shape error of the entire surface 108a to be measured from the spherical surface through integration over the entire microlens array 114. The reference positions of the light spots are not only obtained through use of the plane wave, but may also be positions of light spots obtained through use of a spherical wave of the diffracted light passing through the pinholes or light reflected from a measurement standard. In the case where the light reflected from the measurement standard is set as the reference, the measurement results show a difference from the shape of the standard.

The above description is directed to the light reflected from the surface 108a to be measured, that is, the signal light component contained in the measuring light L1 that travels via the object 108 to be measured. In the first embodiment, the object 108 to be measured is a transparent optical component such as a lens. Therefore, the measuring light L1 that travels via the object 108 to be measured contains the light reflected on the rear surface 108b of the object 108 to be measured, that is, the undesirable light component, as well as the signal light component.

Figure 2:
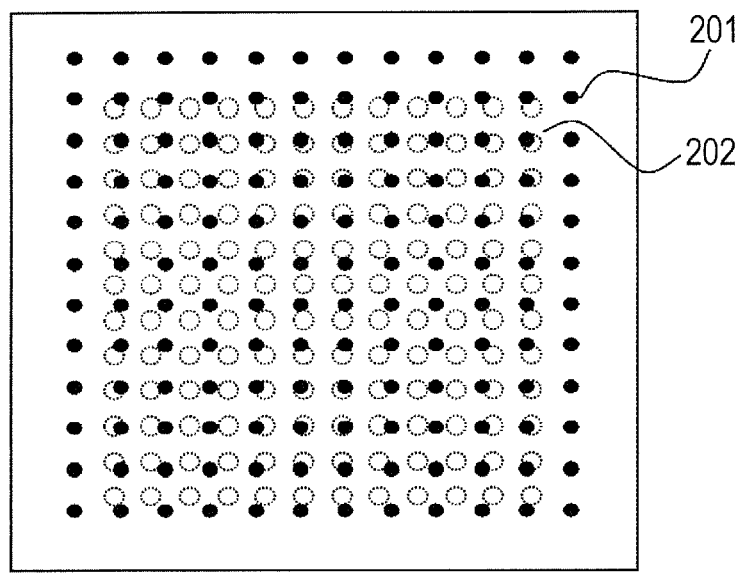
FIG. 2 is a schematic view illustrating a light intensity distribution of front surface reflection light spots and rear surface reflection light spots on a CCD image sensor.

FIG. 2 schematically illustrates the state described above. The light reflected from the rear surface 108b of the object 108 to be measured forms a light spot group 202 of the rear surface 108b on the CCD image sensor 116 along with a reflected light spot group 201 of the surface 108a to be measured. That is, the respective microlenses 114a form signal light spots on the image plane P by condensing the signal light component contained in the measuring light L1 that travels via the object 108 to be measured, and also form undesirable light spots on the image plane P by condensing the undesirable light component contained in the measuring light L1.

Figure 3:
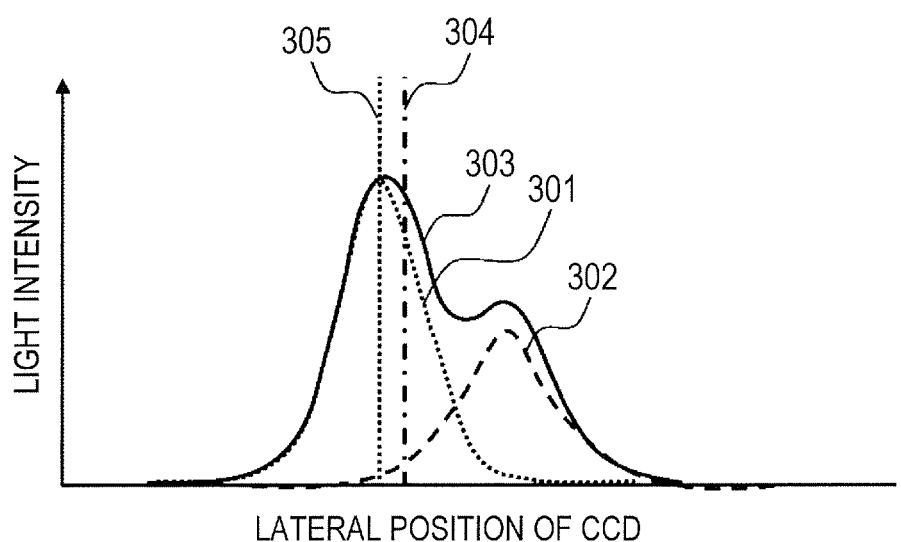
FIG. 3 is a reference graph showing a light intensity distribution of a light spot obtained through a single microlens.

At this time, the light spot of a single microlens region is as shown in a reference graph of FIG. 3. Note that, FIG. 3 shows a state in which the signal light component of the measuring light L1 and the reference light L2 do not interfere with each other. When a light intensity distribution 301 of the light spot from the surface 108a to be measured is combined with a light intensity distribution 302 of the light spot from the rear surface 108b, a light intensity distribution 303 is obtained on the CCD image sensor 116. If a barycenter position of this light intensity distribution 303 is calculated, a barycenter position 304 shown in FIG. 3 is obtained, which deviates from an original position 305 of the light spot from the surface 108a to be measured.

Figure 4:
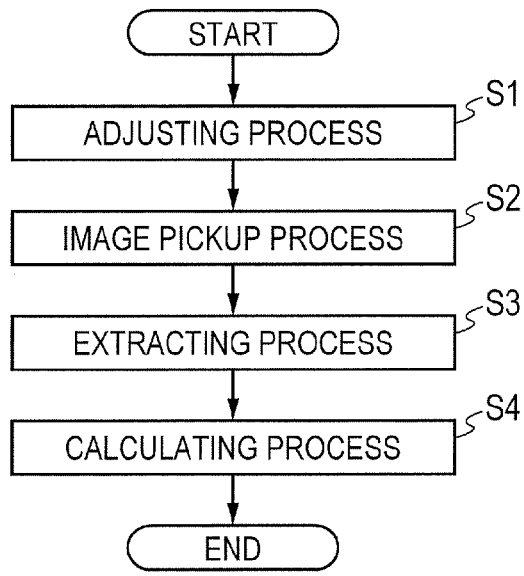
FIG. 4 is a flow chart illustrating a measuring method using the surface shape measuring apparatus.

In view of the above, in the first embodiment, the reference light L2 obtained through the separation by the polarization beam splitter 103 is used for interfering with the light spots of the signal light component of the measuring light L1, to thereby increase the light intensity. FIG. 4 is a flow chart illustrating a measuring method using the surface shape measuring apparatus 100.

First, under the control of the computer 113, the movable stage 117 causes the reference mirror 105 to scan in the direction of the optical axis X. Accordingly, the movable stage 117 changes the optical path length of the reference light L2 that travels from the light source 101 to reach the microlens array 114 (S1: adjusting process). At this time, the movable stage 117 changes the optical path length of the reference light L2 that travels from the light source 101 to reach the microlens array 114 so as to include a range in which the undesirable light component of the measuring light L1 does not interfere with the reference light L2 but the signal light component of the measuring light L1 interferes with the reference light L2.

The computer 113 acquires a plurality of picked-up images sequentially (successively) from the CCD image sensor 116 while changing the optical path length of the reference light L2 that travels from the light source 101 to reach the microlens array 114 (S2: image pickup process).

In this case, "A1" represents the optical path length of the signal light component of the measuring light L1 that is emitted from the light source 101 and reflected on the surface 108a to be measured to reach the microlens array 114, and "A2" represents the optical path length of the undesirable light component of the measuring light L1 that is emitted from the light source 101 and reflected on the rear surface 108b to reach the microlens array 114. Further, "B" represents the optical path length of the reference light L2 that is emitted from the light source 101 and reflected on the reference mirror 105 to reach the microlens array 114.

When the optical path length A1 and the optical path length B are equal to each other with an accuracy of the coherence length of the light source 101 or less, the signal light component of the measuring light L1 from the surface 108a to be measured interferes with the reference light L2 from the reference mirror 105. For example, in the case where the super luminescent diode is used as the light source 101, when the optical path length A1 and the optical path length B are equal to each other with an accuracy of 30 μm or less, the signal light component of the measuring light L1 interferes with the reference light L2. Through the interference between the signal light component of the measuring light L1 and the reference light L2, interference light spots each having a higher light intensity than the normal signal light spots are formed on the image plane P, that is, on the CCD image sensor 116. Further, when the optical path length A1 and the optical path length B are equal to each other, the light intensities of the interference light spots obtained through the interference become highest.

In this case, the coherence length decreases as the wavelength width of the light emitted from the light source increases. Conversely, the coherence length increases as the wavelength width of the light emitted from the light source decreases. In the first embodiment, the light source 101 is a light source for emitting light having a wavelength width set so that the coherence length becomes smaller than an optical path difference between the optical path length A1 of the signal light component and the optical path length A2 of the undesirable light component. Thus, when the signal light component of the measuring light L1 interferes with the reference light L2, the optical path difference between the optical path length A2 and the optical path length B becomes larger than the coherence length of the light source 101, and hence the undesirable light component of the measuring light L1 does not interfere with the reference light L2.

Figure 5:
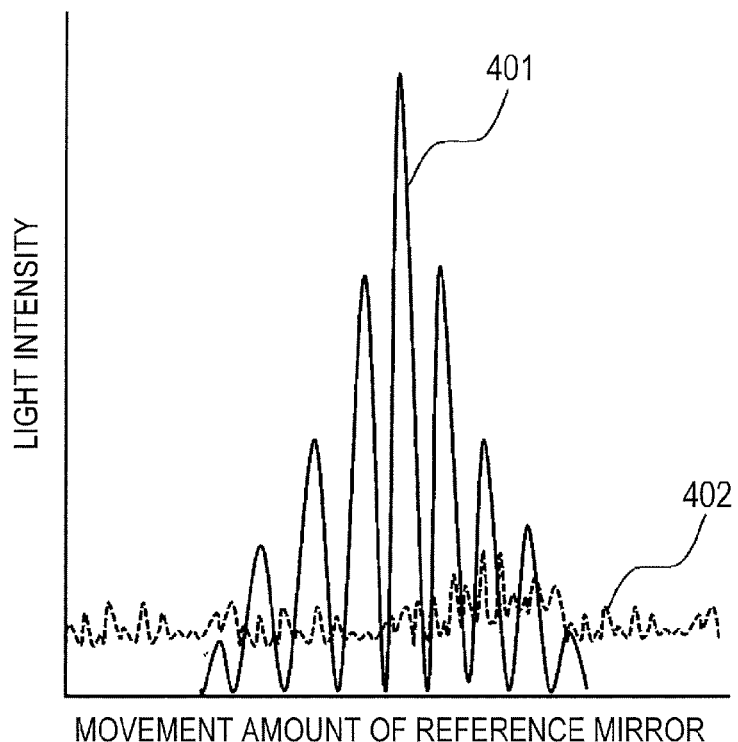
FIG. 5 is a schematic graph showing a state of change in light intensity of the light spot obtained through the single microlens when a reference mirror is moved.

When the movable stage 117 moves the reference mirror 105 in the direction of the optical axis X by an amount corresponding to the coherence length of the light source 101, the light spot on the CCD image sensor 116 formed through a single microlens 114a is as shown in FIG. 5.

In FIG. 5, the vertical axis represents a light intensity of the light spot, and the horizontal axis represents a movement amount of the reference mirror 105. The solid line 401 indicates a change in light intensity of the signal light spot formed of the signal light component from the surface 108a to be measured, and the broken line 402 indicates a change in light intensity of the undesirable light spot formed of the undesirable light component from the rear surface 108b. As is apparent from FIG. 5, the light spot intensity of the light reflected from the surface 108a to be measured is increased through the interference, but the light spot intensity of the light reflected from the rear surface 108b is not increased because no interference occurs.

Thus, the plurality of picked-up images, which are acquired sequentially from the CCD image sensor 116 by changing the optical path length B through use of the movable stage 117, include a picked-up image showing the interference light spots formed of the reference light L2 and the signal light spots obtained by condensing light through the respective microlenses 114a.

In the first embodiment, the interference light spots only need to be picked up as an image by the CCD image sensor 116, and hence there is no need to correctly confirm the movement accuracy and the movement amount of the movable stage 117. In other words, there is no need to position the movable stage 117 with high accuracy.

Subsequently, the computer 113 extracts, from the plurality of picked-up images, the interference light spots (optical image) generated through the interference between the signal light component and the reference light L2 (S3: extracting process). The interference light spots each have a higher light intensity than the signal light spots in the state of no interference, and hence the interference light spots (optical image) can be extracted with high accuracy.

Subsequently, the computer 113 calculates barycenter positions of the extracted interference light spots (optical image), and calculates deviation amounts of the barycenter positions from the predetermined reference positions (S4: calculating process). Then, the computer 113 calculates a difference of the surface shape from the reference based on the deviation amounts of the respective light spots.

Assuming that the object 108 to be measured is an optical component obtained through a production process for the optical component, the measuring method of the first embodiment is suitable when applied to an inspection process in the manufacturing line for the object 108 to be measured. In this inspection process, the quality of the object 108 to be measured is determined, and products other than conforming products may be subjected to a correction process of correcting the difference of the surface shape from the reference, or may be rejected from the manufacturing line.

As described above, according to the first embodiment, the interference light spots obtained through the interference between the reference light L2 and the signal light component contained in the measuring light L1, which travels via the object 108 to be measured, have a higher light intensity than the signal light spots of the signal light component through the interference. Thus, the distinction from the undesirable light spots is facilitated so that the interference light spots can be extracted easily. As a result, the barycenter positions of the interference light spots can be determined with high accuracy while suppressing the influence of the undesirable light spots, and the deviation amounts of the barycenter positions can be determined with high accuracy. Accordingly, the surface shape of the object 108 to be measured can be measured with high accuracy.

In particular, in a case where the object 108 to be measured is a meniscus lens having curvatures of both surfaces approximate to each other, the measuring method is effective because the positions of the signal light spots (front surface reflection light spots) and the undesirable light spots (rear surface reflection light spots) are located in proximity.

Further, in the first embodiment, the measuring light L1 passes through the linear polarization plate 110, and the reference light L2 cannot pass through the linear polarization plate 110 but is diffracted through the pinholes 110a of the linear polarization plate 110. Thus, the measuring light L1 is imaged on the CCD image sensor 116 through the microlens array 114, and the reference light L2 is not imaged but irradiates the CCD image sensor 116 as substantially collimated light. Accordingly, even when the light spots of the measuring light L1 are shifted, the signal light spots formed of the signal light component of the measuring light L1 can interfere with the reference light L2.

In the processing of Step S4, the computer 113 may calculate the barycenter positions of the respective interference light spots through use of a part of the interference light spots (optical image) of the acquired picked-up images which has the light intensity exceeding a predetermined threshold value. In this manner, through use of a part of the optical image of the interference light spots which has the light intensity exceeding the threshold value, the computer 113 can calculate the barycenter positions of the respective interference light spots with higher accuracy.

Note that, all the interference light spots may be shown in a single picked-up image, but the respective interference light spots may be shown in a plurality of picked-up images in a separate manner. For example, in a case where the shape error of the surface 108a to be measured is significant or the surface 108a to be measured has an aspheric shape, the shape difference of the surface 108a to be measured from the spherical surface may become larger than the coherence length of the light source 101. In this case, the optical image of the interference light spots over the entire surface 108a to be measured cannot be obtained with a single picked-up image. Even in the above-mentioned case where the interference light spots cannot be obtained at the same time over the entire surface of the data region, it is only necessary that the movable stage 117 cause the reference mirror 105 to scan until the optical image of the interference light spots due to the interference can be obtained over the entire surface to be measured, and then all the interference light spots shown in the respective picked-up images in a separate manner be extracted sequentially from the picked-up images.

Further, in the first embodiment described above, the front surface 108a of the object 108 to be measured is the surface to be measured, but the rear surface 108b may be the surface to be measured. That is, the positions of the light spots of the light reflected from the rear surface 108b may be detected by a similar measuring method to that of the first embodiment described above while eliminating the influence of the light reflected from the front surface 108a. In this case, the light reflected from the front surface 108a corresponds to the undesirable light component.

In this case, through the movement of the reference mirror 105, the optical path length of the light that is emitted from the light source 101 and reflected on the rear surface 108b to reach the microlens array 114 can be set equal to the optical path length of the light that is emitted from the light source 101 and reflected on the reference mirror 105 to reach the microlens array 114.

The light reflected from the rear surface 108b falls within the range of the coherence length of the light source 101, and hence the interference occurs in the Shack-Hartmann sensor 111, but the light reflected from the front surface 108a has an optical path difference equal to or larger than the coherence length of the light source 101, and hence no interference occurs. Thus, with the interference light spots obtained through the interference of the spots of the light reflected from the rear surface 108b, the barycenter positions can be calculated with high accuracy while suppressing the influence of the light reflected from the front surface 108a. At this time, a threshold value of the light intensity is provided, and the barycenter positions are calculated through use of only the light intensity equal to or larger than the threshold value. In this manner, the positions of the light spots can be determined with higher accuracy without the influence of the light reflected from the front surface 108a.

Further, through application of those measuring methods, the surface shapes of both the surfaces 108a and 108b of the object 108 to be measured can be determined at the same time. At this time, the optical path lengths ranging from the respective surfaces 108a and 108b to the microlens array 114 are different from each other, and hence, when the optical path length of the reference light L2 is changed and one of the light reflected from the front surface 108a and the light reflected from the rear surface 108b interferes with the reference light L2, the other light does not interfere with the reference light L2. Thus, when the front surface 108a is set as the surface to be measured, the light reflected from the rear surface 108b corresponds to the undesirable light component, and when the rear surface 108b is set as the surface to be measured, the light reflected from the front surface 108a corresponds to the undesirable light component.

Thus, the reference mirror 105 is caused to scan so that each of the light reflected from the front surface 108a and the light reflected from the rear surface 108b interferes with the reference light L2. As a result, the surface shapes of both the surfaces 108a and 108b can be determined. Accordingly, the relationship of both the surfaces, such as decentering of the object to be measured, can be determined.

Second Embodiment

Figure 6A:
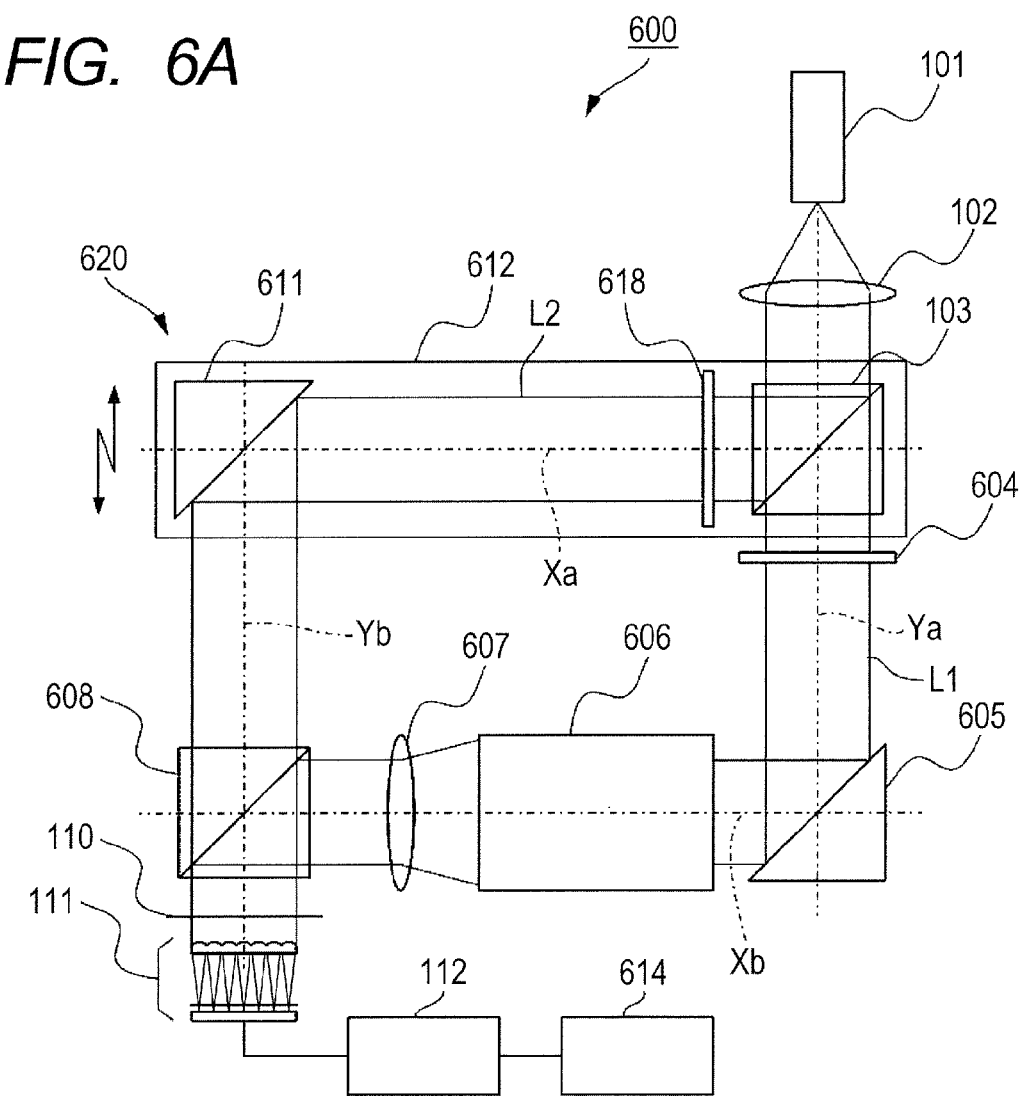
FIG. 6A is an explanatory view illustrating a schematic configuration of a wavefront aberration measuring apparatus as an example of a measuring apparatus according to a second embodiment of the present invention.
Figure 6B:
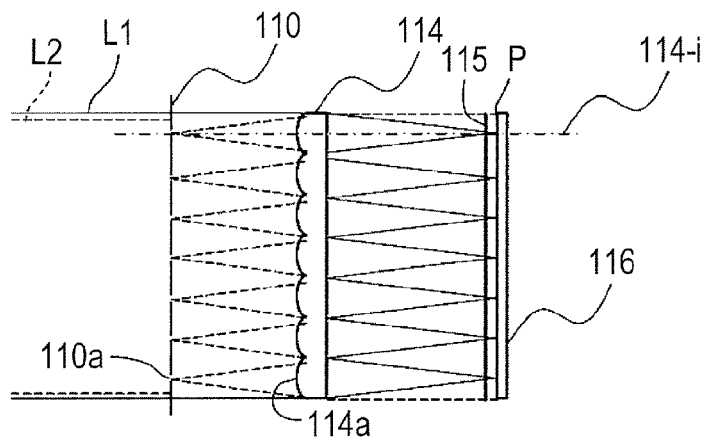
FIG. 6B is an enlarged view illustrating the vicinity of a Shack-Hartmann sensor of the measuring apparatus according to the second embodiment of the present invention.

Next, a wavefront aberration measuring apparatus as an example of a measuring apparatus according to a second embodiment of the present invention is described. FIG. 6A is an explanatory view illustrating a schematic configuration of the wavefront aberration measuring apparatus as an example of the measuring apparatus according to the second embodiment of the present invention. FIG. 6B is an enlarged view illustrating the vicinity of a Shack-Hartmann sensor. Note that, in the second embodiment, components similar to those in the first embodiment described above are represented by the same reference symbols, and detailed description thereof is therefore omitted herein. In the second embodiment, an object 606 to be measured is an optical component such as a lens barrel with a lens.

A wavefront aberration measuring apparatus 600 is configured to measure a wavefront aberration of the object 606 to be measured. As illustrated in FIG. 6A, the wavefront aberration measuring apparatus 600 includes the light source 101, the collimator lens 102, the polarization beam splitter 103 serving as a separating optical system, a half wavelength plate 604, a deflection mirror 605, and a collimator lens 607. Further, the wavefront aberration measuring apparatus 600 includes a polarization beam splitter 608, a half wavelength plate 618, a deflection mirror 611, the linear polarization plate 110, the Shack-Hartmann sensor 111, the frame grabber 112, and a computer 614 serving as a calculating unit. Still further, in the second embodiment, the wavefront aberration measuring apparatus 600 includes a movable stage 612 serving as an adjusting unit.

As illustrated in FIG. 6B, similarly to the first embodiment described above, the Shack-Hartmann sensor 111 includes the microlens array 114 formed of a plurality of microlenses 114a, the linear polarizing element 115, and the CCD image sensor 116 serving as the image pickup element.

As illustrated in FIG. 6A, on an optical axis Ya of the light source 101, the collimator lens 102, the polarization beam splitter 103, the half wavelength plate 604, and the deflection mirror 605 are arranged sequentially in a traveling direction of the light emitted from the light source 101. Further, on an optical axis Xa, which is orthogonal to the optical axis Ya and passes through the polarization beam splitter 103, the half wavelength plate 618 and the deflection mirror 611 are arranged sequentially in a direction away from the polarization beam splitter 103. Still further, on an optical axis Xb, which is orthogonal to the optical axis Ya and passes through the deflection mirror 605, the object 606 to be measured, the collimator lens 607, and the polarization beam splitter 608 are arranged sequentially in a direction away from the deflection mirror 605. Yet further, on an optical axis Yb, which is orthogonal to the optical axis Xa and the optical axis Xb and passes through the deflection mirror 611, the polarization beam splitter 608, the linear polarization plate 110, and the Shack-Hartmann sensor 111 are arranged sequentially in a direction away from the deflection mirror 611.

Similarly to the first embodiment described above, the light source 101 is a light source for emitting light having a wavelength width set so that the coherence length becomes smaller than the optical path difference between the optical path length (optical distance) of the signal light component and the optical path length (optical distance) of the undesirable light component, which are contained in the measuring light L1. The collimator lens 102 converts the light emitted from the light source 101 into collimated light.

The polarization beam splitter 103 causes the measuring light L1 as the p-polarized light to pass therethrough toward the half wavelength plate 604, and reflects the reference light L2 as the s-polarized light at an angle of 90° toward the half wavelength plate 618.

The half wavelength plate 604 rotates the polarizing direction of the measuring light L1 as the p-polarized light at an angle of 90° to convert the measuring light L1 into s-polarized light. The deflection mirror 605 deflects and reflects the incident measuring light L1 at an angle of 90° in the direction of the object 606 to be measured. The collimator lens 607 converts the measuring light L1 passing through the object 606 to be measured into collimated light.

On the other hand, the half wavelength plate 618 rotates the polarizing direction of the reference light L2 as the s-polarized light at an angle of 90° to convert the measuring light L2 into p-polarized light. The deflection mirror 611 deflects and reflects the incident reference light L2 at an angle of 90° in the direction of the polarization beam splitter 608.

The polarization beam splitter 608 reflects the measuring light L1 as the s-polarized light at an angle of 90°, and causes the reference light L2 as the p-polarized light to pass (travel straight) therethrough. Accordingly, the measuring light L1 and the reference light L2 irradiate the linear polarization plate 110.

The linear polarization plate 110, the Shack-Hartmann sensor 111, and the frame grabber 112 have similar configurations to those in the first embodiment described above. Note that, the computer 614 has a similar hardware configuration to that in the first embodiment described above, but is different in arithmetic processing from that in the first embodiment. That is, in the first embodiment described above, the computer 113 is configured to determine the difference of the surface shape from the reference based on the deviation amounts of the light spots, but in the second embodiment, the computer 614 is configured to determine a wavefront aberration of the object to be measured based on the deviation amounts of the light spots.

In the second embodiment, the half wavelength plate 618, the deflection mirror 611, and the linear polarization plate 110 constitute a reference light optical system 620 for guiding, to the image plane P, the reference light L2 obtained through the separation by the polarization beam splitter 103.

The polarization beam splitter 103, the half wavelength plate 618, and the deflection mirror 611 are fixed to the movable stage 612 serving as the adjusting unit. Under control of the computer 614, the movable stage 612 moves the polarization beam splitter 103, the half wavelength plate 618, and the deflection mirror 611 in a direction parallel to the direction of the optical axes Ya and Yb. Accordingly, the optical path length of the reference light L2 that travels from the light source 101 via the deflection mirror 611 to reach the microlens array 114 can be changed. That is, in the second embodiment, the optical path length of the reference light L2 that travels from the light source 101 to reach the microlens array 114 is defined as the object to be adjusted. The movable stage 612 moves the polarization beam splitter 103, the half wavelength plate 618, and the deflection mirror 611 in accordance with an instruction from the computer 614, and thus the optical path length of the reference light L2 can be changed.

Next, the case where light is emitted from the light source 101 is described. The light emitted from the light source 101 is converted into collimated light by the collimator lens 102, and the polarization beam splitter 103 separates the collimated light into the measuring light L1 as the p-polarized light and the reference light L2 as the s-polarized light.

The measuring light L1 passing through the polarization beam splitter 103 is converted into s-polarized light by the half wavelength plate 604, and is reflected on the deflection mirror 605 at an angle of 90°. The reflected measuring light L1 passes through the object 606 to be measured, and is converted into collimated light by the collimator lens 607. The collimated measuring light L1 irradiates the polarization beam splitter 608. The measuring light L1 is converted into the s-polarized light, and is therefore reflected on the polarization beam splitter 608 at an angle of 90° to irradiate the linear polarization plate 110.

On the other hand, the reference light L2 reflected on the polarization beam splitter 103 is converted into p-polarized light by the half wavelength plate 618, and is reflected on the deflection mirror 611 at an angle of 90°. The reflected reference light L2 irradiates the polarization beam splitter 608. The reference light L2 is converted into the p-polarized light, and hence travels straight through the polarization beam splitter 608 to irradiate the linear polarization plate 110.

The reference light L2 and the measuring light L1 that enter the linear polarization plate 110 have their polarizing directions orthogonal to each other. Specifically, the reference light L2 that enters the linear polarization plate 110 is the p-polarized light, whereas the measuring light L1 that enters the linear polarization plate 110 is the s-polarized light. The linear polarization plate 110 is installed so that the polarizing direction (transmission axis direction) of the linear polarization plate 110 matches with the polarizing direction of the measuring light L1, and hence the measuring light L1 that enters the linear polarization plate 110 passes through the linear polarization plate 110. Then, the measuring light L1 passing through the linear polarization plate 110 is condensed by the respective microlenses 114a of the microlens array 114 so that a light spot group (plurality of light spots) is formed on the CCD image sensor 116.

On the other hand, the reference light L2 that enters the linear polarization plate 110 has its polarizing direction orthogonal to the polarizing direction (transmission axis direction) of the linear polarization plate 110, and hence the reference light L2 does not pass through the linear polarization plate 110 but is diffracted through the respective pinholes 110a of the linear polarization plate 110. Then, the reference light L2 diffracted on the linear polarization plate 110 is converted into substantially collimated light by the microlens array 114, and enters the CCD image sensor 116.

In this case, the linear polarizing element 115 having its polarizing direction set at an angle of 45° with respect to the polarizing directions of the measuring light L1 and the reference light L2 is provided between the microlens array 114 and the CCD image sensor 116. Accordingly, the measuring light L1 and the reference light L2 pass through the linear polarizing element 115 with their polarizing directions aligned.

The picked-up image, which is obtained by the CCD image sensor 116 and contains the light spot group, is received by the computer 614 via the frame grabber 112. The computer 614 determines barycenters of light intensities of the respective light spots, to thereby calculate barycenter positions of the light spots.

When the wavefront of the measuring light L1 that enters the Shack-Hartmann sensor 111 is a plane (a plane wave), the barycenter positions of the light spots are located on the optical axes 114-$i$ ("i" represents a serial number of the microlens) of the microlenses 114a, respectively. One element (microlens 114a) of the microlens array 114 corresponds to one region of the object 606 to be measured.

When one region of the object 606 to be measured has any aberration, the position of the light spot obtained through the microlens 114a corresponding to the one region deviates from a reference position depending on a mean value of the aberrations in the one region.

The reference position is acquired by the computer 614 as calibration data indicating a specific position of a reference light spot on the CCD image sensor 116, the reference light spot being obtained in advance under a state in which the object 606 to be measured is removed from the optical path. That is, the computer 614 prestores the reference positions of the respective light spots in a storage unit (not shown).

The computer 614 compares the reference positions of the light spots to the positions of the light spots of the measuring light passing through the object 606 to be measured, and determines the wavefront aberration of the incident light, to thereby calculate a difference of the object 606 to be measured from the reference. The reference positions of the light spots may be determined based on light passing through an optical element set as a standard. In this case, the measurement results show a difference from the optical element set as the standard.

The above description is directed to the light passing through the object 606 to be measured, that is, the signal light component contained in the measuring light L1 that travels via the object 606 to be measured. In actuality, however, the measuring light L1 that travels via the object 606 to be measured contains multiple reflected light resulting from multiple reflection occurring inside the object 606 to be measured or multiple reflection from other optical surfaces, that is, the undesirable light component. The undesirable light component forms a light spot group on the CCD image sensor 116 similarly to the rear surface reflection light in the first embodiment described above. That is, the respective microlenses 114a form signal light spots on the image plane P by condensing the signal light component contained in the measuring light L1 that travels via the object 606 to be measured, and also form undesirable light spots on the image plane P by condensing the undesirable light component contained in the measuring light L1. Those undesirable light spots cause deterioration in accuracy of the position detection of the signal light spots as described in the first embodiment described above.

In view of the above, in the second embodiment, similarly to the first embodiment described above, the reference light L2 obtained through the separation by the polarization beam splitter 103 is used for interfering with the light spots of the signal light component of the measuring light L1, to thereby increase the light intensity. Note that, a measuring method using the wavefront aberration measuring apparatus 600 is similar to that in the first embodiment described above, and is therefore described with reference to the flow chart of FIG. 4.

First, under the control of the computer 614, the movable stage 612 causes the polarization beam splitter 103, the half wavelength plate 618, and the deflection mirror 611 to scan in the direction parallel to the optical axes Ya and Yb. Accordingly, the movable stage 612 changes the optical path length of the reference light L2 that travels from the light source 101 to reach the microlens array 114 (S1: adjusting process). At this time, the movable stage 612 changes the optical path length of the reference light L2 that travels from the light source 101 to reach the microlens array 114 so as to include a range in which the undesirable light component of the measuring light L1 does not interfere with the reference light L2 but the signal light component of the measuring light L1 interferes with the reference light L2.

The computer 614 acquires a plurality of picked-up images sequentially (successively) from the CCD image sensor 116 while changing the optical path length of the reference light L2 that travels from the light source 101 to reach the microlens array 114 (S2: image pickup process).

In this case, "C1" represents the optical path length of the signal light component of the measuring light L1 that is emitted from the light source 101 to reach the microlens array 114, and "C2" represents the optical path length of the undesirable light component of the measuring light L1 that is emitted from the light source 101 to reach the microlens array 114. Further, "D" represents the optical path length of the reference light L2 that is emitted from the light source 101 to reach the microlens array 114.

When the optical path length C1 and the optical path length D are equal to each other with an accuracy of the coherence length of the light source 101 or less, the signal light component of the measuring light L1 that travels via the object 606 to be measured interferes with the reference light L2. For example, in the case where the super luminescent diode is used as the light source 101, when the optical path length C1 and the optical path length D are equal to each other with an accuracy of 30 µm or less, the signal light component of the measuring light L1 interferes with the reference light L2. Through the interference between the signal light component of the measuring light L1 and the reference light L2, interference light spots each having a higher light intensity than the normal signal light spots are formed on the image plane P, that is, on the CCD image sensor 116. Further, when the optical path length C1 and the optical path length D are equal to each other, the light intensities of the interference light spots obtained through the interference become highest.

In this case, the coherence length decreases as the wavelength width of the light emitted from the light source increases. Conversely, the coherence length increases as the wavelength width of the light emitted from the light source decreases. In the second embodiment, the light source 101 is a light source for emitting light having a wavelength width set so that the coherence length becomes smaller than an optical path difference between the optical path length C1 of the signal light component and the optical path length C2 of the undesirable light component. Thus, when the signal light component of the measuring light L1 interferes with the reference light L2, the optical path difference between the optical path length C2 and the optical path length D becomes larger than the coherence length of the light source 101, and hence the undesirable light component of the measuring light L1 does not interfere with the reference light L2.

When the movable stage 612 moves in the direction parallel to the optical axes Ya and Yb by an amount corresponding to the coherence length of the light source 101, the light spot on the CCD image sensor 116 formed through a single microlens 114a is as shown in FIG. 5 similarly to the first embodiment described above. Similarly in this case, the solid line 401 indicates a change in light intensity of the signal light spot formed of the signal light component of the measuring light L1, and the broken line 402 indicates a change in light intensity of the undesirable light spot formed of the undesirable light component of the measuring light L1. As is apparent from FIG. 5, the light intensity of the signal light spot is increased through the interference, but the light intensity of the undesired light spot is not increased because no interference occurs.

Thus, the plurality of picked-up images, which are acquired sequentially from the CCD image sensor 116 by changing the optical path length D through use of the movable stage 612, include a picked-up image showing the interference light spots formed of the reference light L2 and the signal light spots obtained by condensing light through the respective microlenses 114a.

In the second embodiment, the interference light spots only need to be picked up as an image by the CCD image sensor 116, and hence there is no need to correctly confirm the movement accuracy and the movement amount of the movable stage 612. In other words, there is no need to position the movable stage 612 with high accuracy.

Subsequently, the computer 614 extracts, from the plurality of picked-up images, the interference light spots (optical image) generated through the interference between the signal light component and the reference light L2 (S3: extracting process). The interference light spots each have a higher light intensity than the signal light spots in the state of no interference, and hence the interference light spots (optical image) can be extracted with high accuracy.

Subsequently, the computer 614 calculates barycenter positions of the extracted interference light spots (optical image), and calculates deviation amounts of the barycenter positions from the predetermined reference positions (S4: calculating process). Then, the computer 614 calculates the wavefront aberration of the object 606 to be measured based on the deviation amounts of the respective light spots.

The measuring method of the second embodiment is suitable when applied to an inspection process in the manufacturing line for the object 606 to be measured as the optical component. In this inspection process, the quality of the object 606 to be measured is determined, and products other than conforming products of the object 606 to be measured may be subjected to a correction process, or may be rejected from the manufacturing line.

As described above, according to the second embodiment, the interference light spots obtained through the interference between the reference light L2 and the signal light component contained in the measuring light L1, which travels via the object 606 to be measured, have a higher light intensity than the signal light spots of the signal light component through the interference. Thus, the distinction from the undesirable light spots is facilitated so that the interference light spots can be extracted easily. As a result, the barycenter positions of the interference light spots can be determined with high accuracy while suppressing the influence of the undesirable light spots, and the deviation amounts of the barycenter positions can be determined with high accuracy. Accordingly, the wavefront aberration of the object 606 to be measured can be measured with high accuracy.

Further, in the second embodiment, the measuring light L1 passes through the linear polarization plate 110, and the reference light L2 cannot pass through the linear polarization plate 110 but is diffracted through the pinholes 110a of the linear polarization plate 110. Thus, the measuring light L1 is imaged on the CCD image sensor 116 through the microlens array 114, and the reference light L2 is not imaged but irradiates the CCD image sensor 116 as substantially collimated light. Accordingly, even when the light spots of the measuring light L1 are shifted, the signal light spots formed of the signal light component of the measuring light L1 can interfere with the reference light L2.

In the processing of Step S4, the computer 614 may calculate the barycenter positions of the respective interference light spots through use of a part of the interference light spots (optical image) of the acquired picked-up images which has the light intensity exceeding a predetermined threshold value. In this manner, through use of a part of the optical image of the interference light spots which has the light intensity exceeding the threshold value, the computer 614 can calculate the barycenter positions of the respective interference light spots with higher accuracy.

Note that, all the interference light spots may be shown in a single picked-up image, but the respective interference light spots may be shown in a plurality of picked-up images in a separate manner. For example, in a case where the wavefront aberration of the object 606 to be measured is significant, there is generated a region in which the difference between the optical path length of the signal light component of the measuring light L1 and the optical path length of the reference light becomes larger than the coherence length of the light source 101. Even in the above-mentioned case where the interference light spots cannot be obtained at the same time over the entire surface of the data region, it is only necessary that the movable stage 612 scan until the optical image including the all interference light spots generated with the light passing through the object 606 to be measured can be obtained, and then all the interference light spots shown in the respective picked-up images in a separate manner be extracted sequentially from the picked-up images.

Third Embodiment

Figure 7:
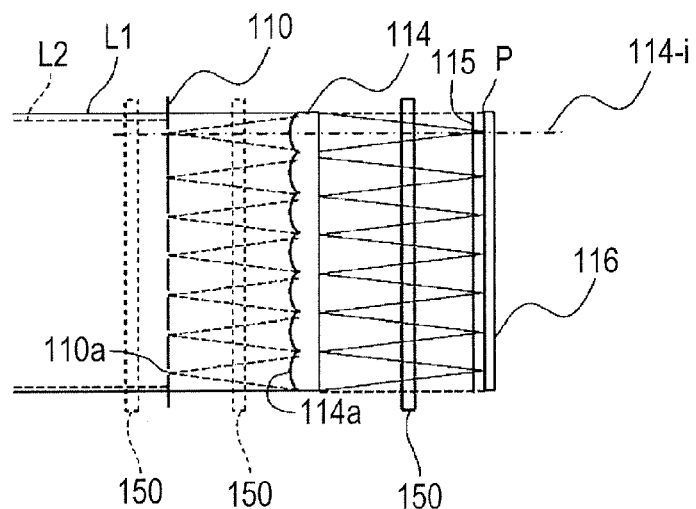
FIG. 7 is an explanatory view illustrating a main part of a measuring apparatus according to a third embodiment of the present invention.

Next, a measuring apparatus according to a third embodiment of the present invention is described. FIG. 7 is an explanatory view illustrating a main part of the measuring apparatus according to the third embodiment of the present invention. In the third embodiment, as illustrated in FIG. 7, the measuring apparatus of each of the first and second embodiments described above further includes an ND filter 150 for attenuating the measuring light L1 that travels via the object to be measured.

It is preferred that the ND filter 150 be arranged between the microlens array 114 and the CCD image sensor 116 serving as the image pickup element, but the present invention is not limited thereto. For example, the ND filter 150 may be provided between the linear polarization plate 110 and the microlens array 114, or may be provided on the upstream side of the linear polarization plate 110 in the light incident direction.

The ND filter 150 is provided as described above, and thus the undesirable light component contained in the measuring light L1 is attenuated, with the result that the influence of the undesirable light component can further be suppressed.

Note that, the present invention is not limited to the embodiments described above, and various modifications may be made thereto by a person having ordinary skill in the art within the technical spirit of the present invention.

Figure 8:
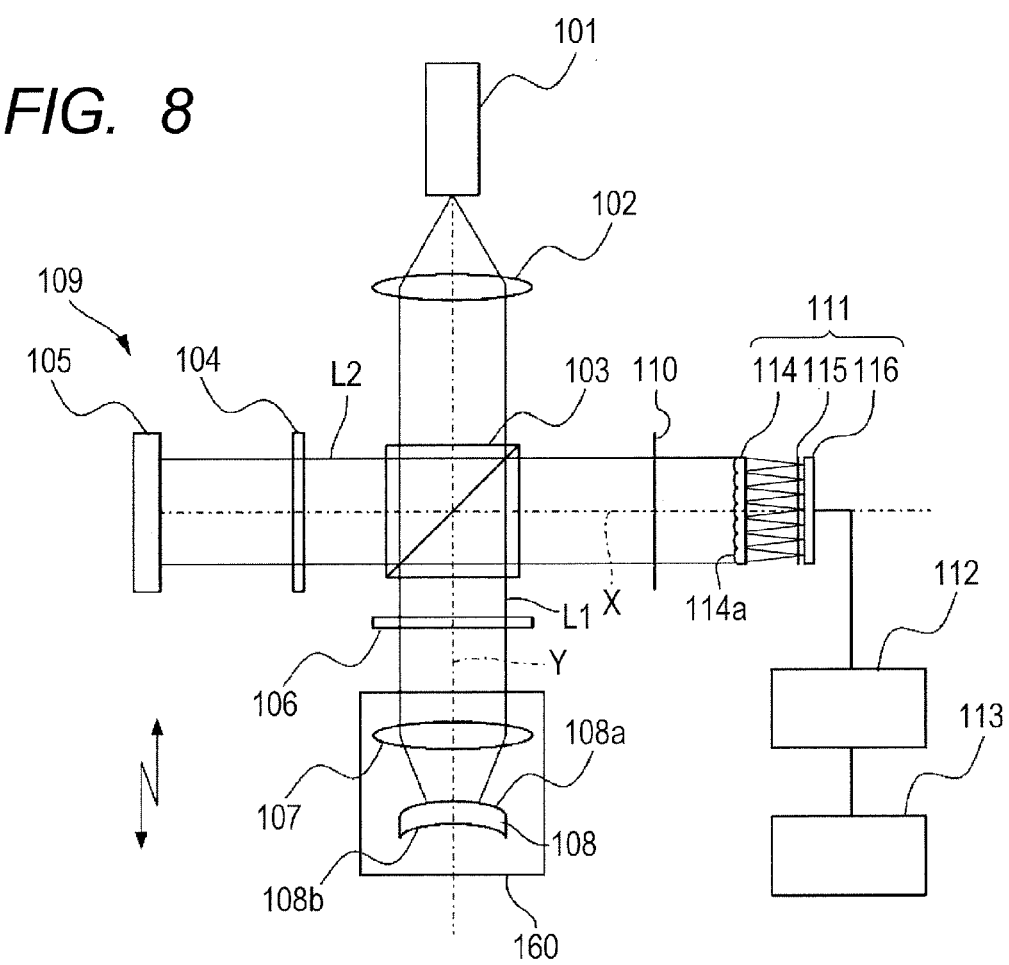
FIG. 8 is an explanatory view illustrating a modification embodiment of the measuring apparatus.
Figure 9:
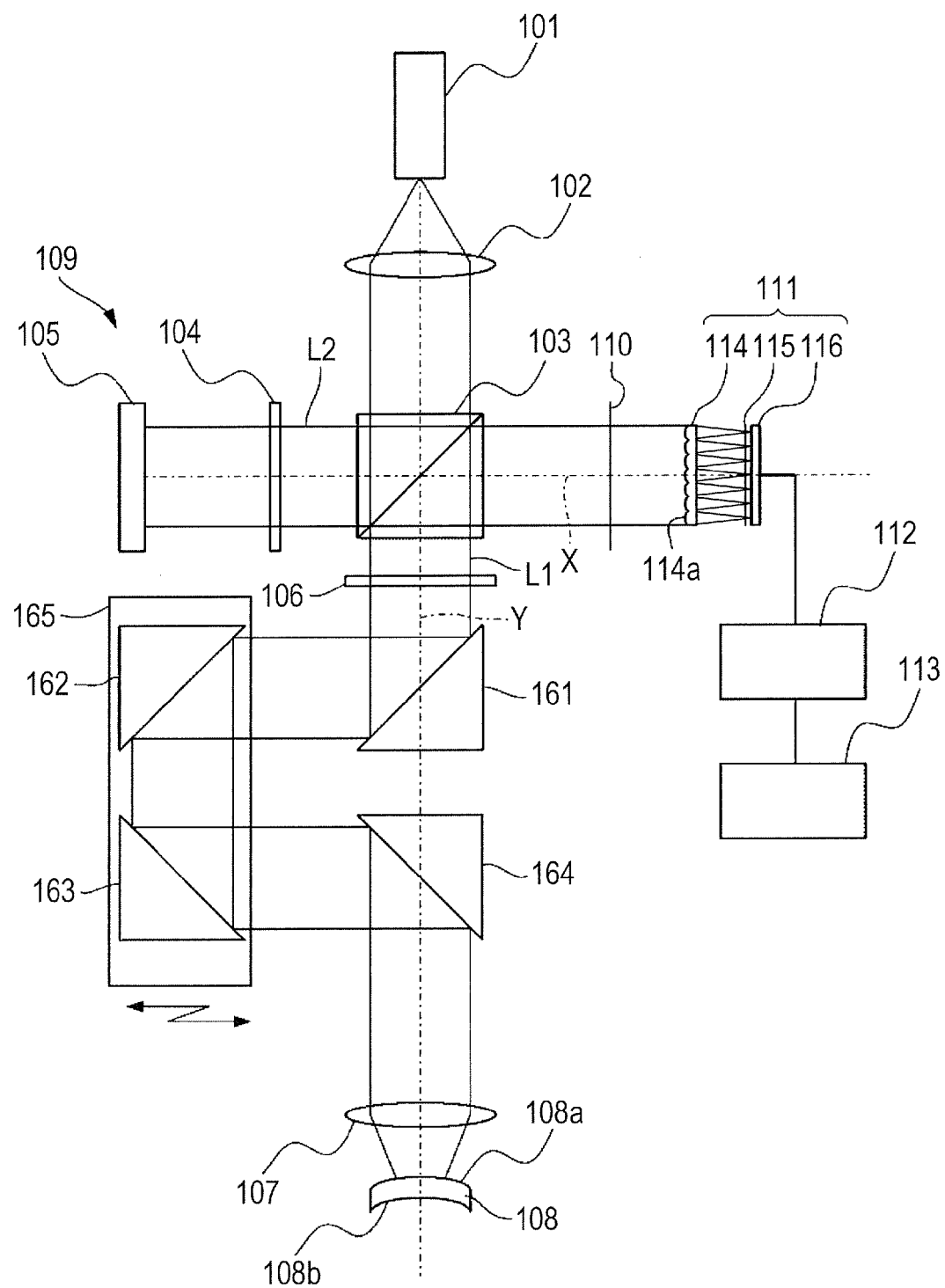
FIG. 9 is an explanatory view illustrating a modification embodiment of the measuring apparatus.

In the first to third embodiments described above, the optical path length of the reference light is changed, but the optical path length of the measuring light may be changed. In this case, for example, as illustrated in FIG. 8, the lens 107 and the object 108 to be measured may be installed on a movable stage 160, and the movable stage 160 may be moved in the direction of the optical axis Y. With this configuration, the optical path length of the measuring light is changed. Further, for example, as illustrated in FIG. 9, a plurality of deflection mirrors 161 to 164 may be provided, and the adjusting unit may be constructed of a movable stage 165 for moving the deflection mirrors 162 and 163 in parallel to the optical axis X. Still further, in the first to third embodiments described above, the measuring apparatus may further include a movable stage for changing the optical path length of the measuring light. With this configuration, the optical path length of the reference light and the optical path length of the measuring light are changed.

Figure 10:
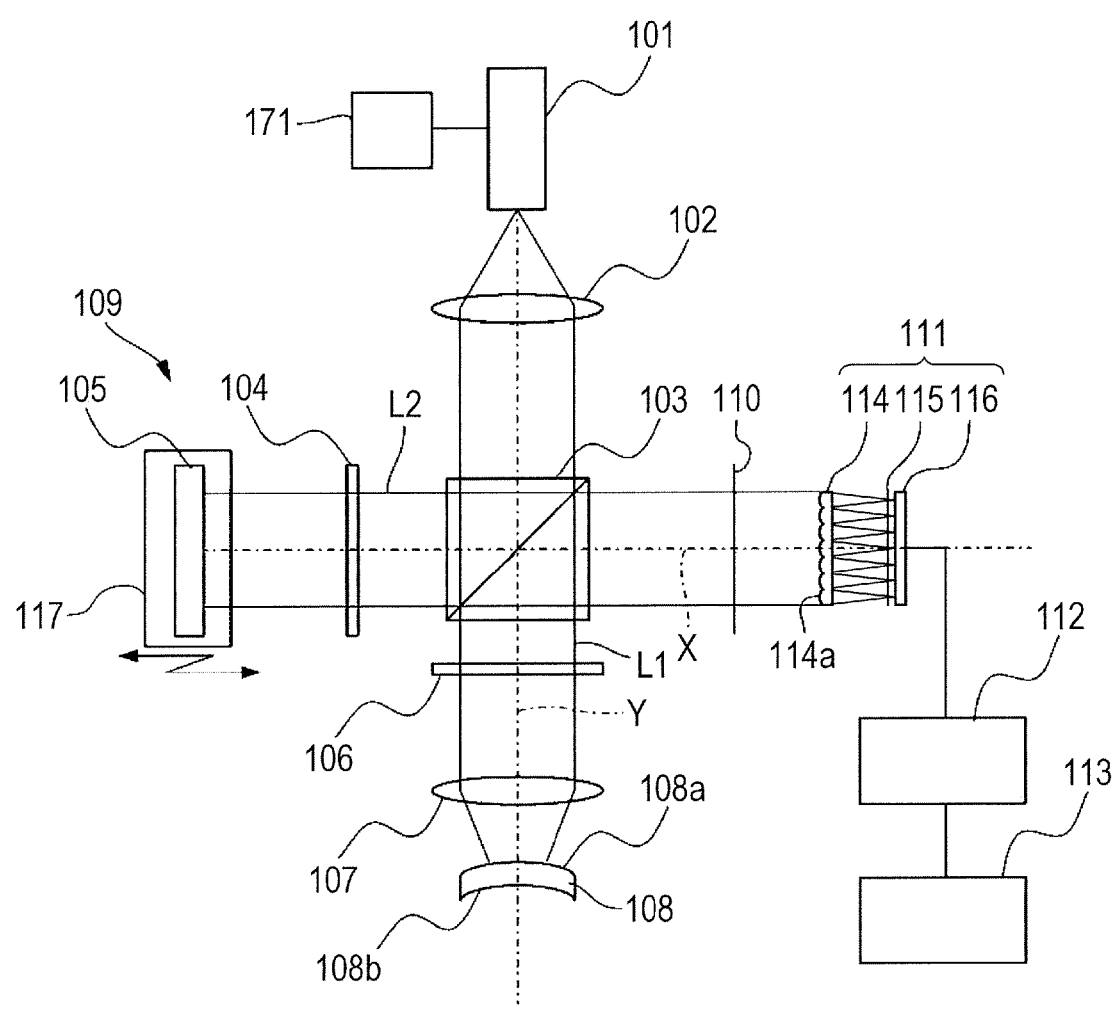
FIG. 10 is an explanatory view illustrating a modification embodiment of the measuring apparatus.

Further, in the first to third embodiments described above, the optical path length of the reference light is changed, but the wavelength width of the light source may be changed. In this case, as illustrated in FIG. 10, a wavelength width adjusting unit 171 for changing the wavelength width of the light source 101 only needs to be connected to the light source 101 as the adjusting unit. When the wavelength width adjusting unit 171 changes the wavelength width of the light source, the coherence length is changed. In FIG. 5, the position of the highest peak of the light intensity does not change, but the positions of the other peaks of the light intensity change. As a result, the signal light component of the measuring light can interfere with the reference light. Still further, in the first to third embodiments or modification examples described above (FIGS. 8 and 9), the measuring apparatus may further include, as the adjusting unit, the wavelength width adjusting unit for changing the wavelength width of the light source. That is, it is only necessary that the adjusting unit be configured to change at least one object to be adjusted among the optical path length of the measuring light, the optical path length of the reference light, and the wavelength width of the light source.

Figure 11:
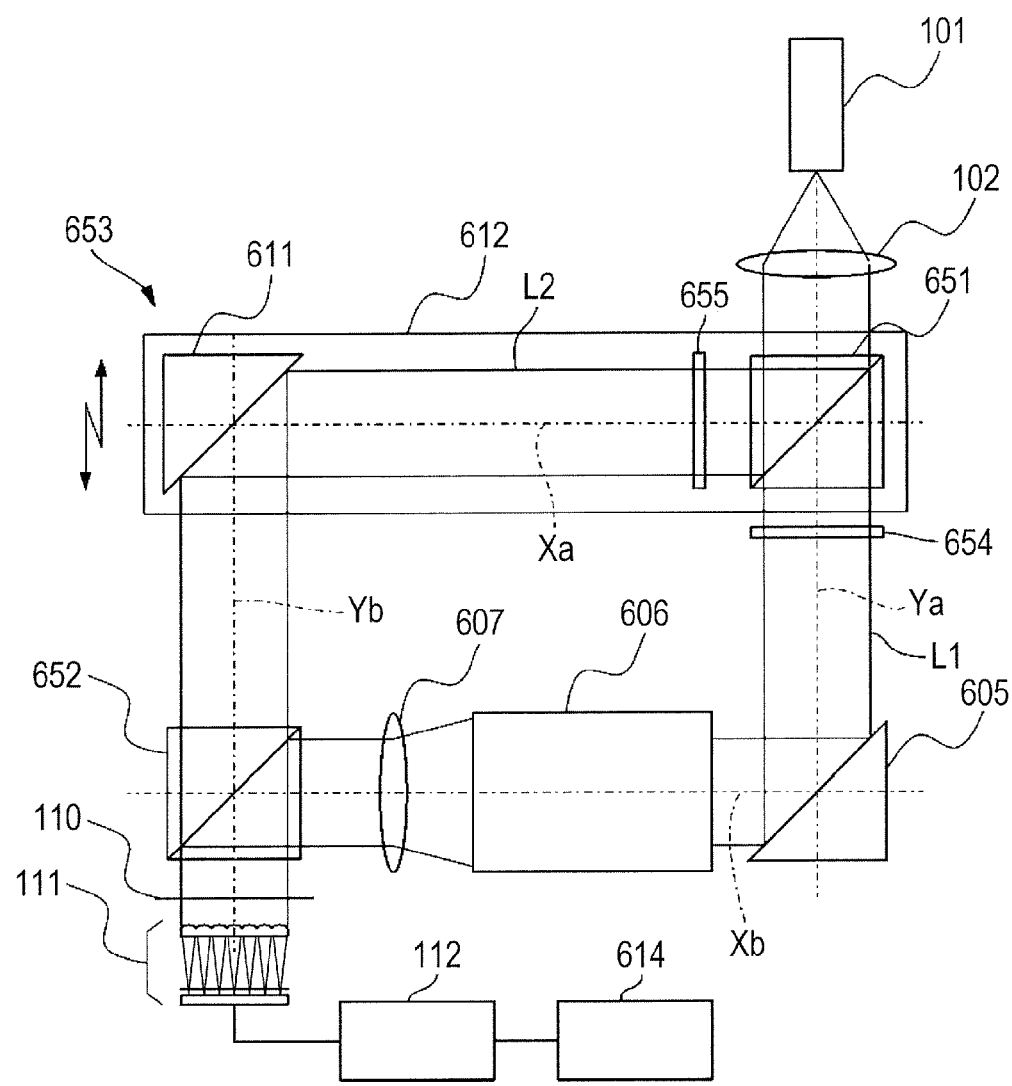
FIG. 11 is an explanatory view illustrating a modification embodiment of the measuring apparatus.
Figure 12:
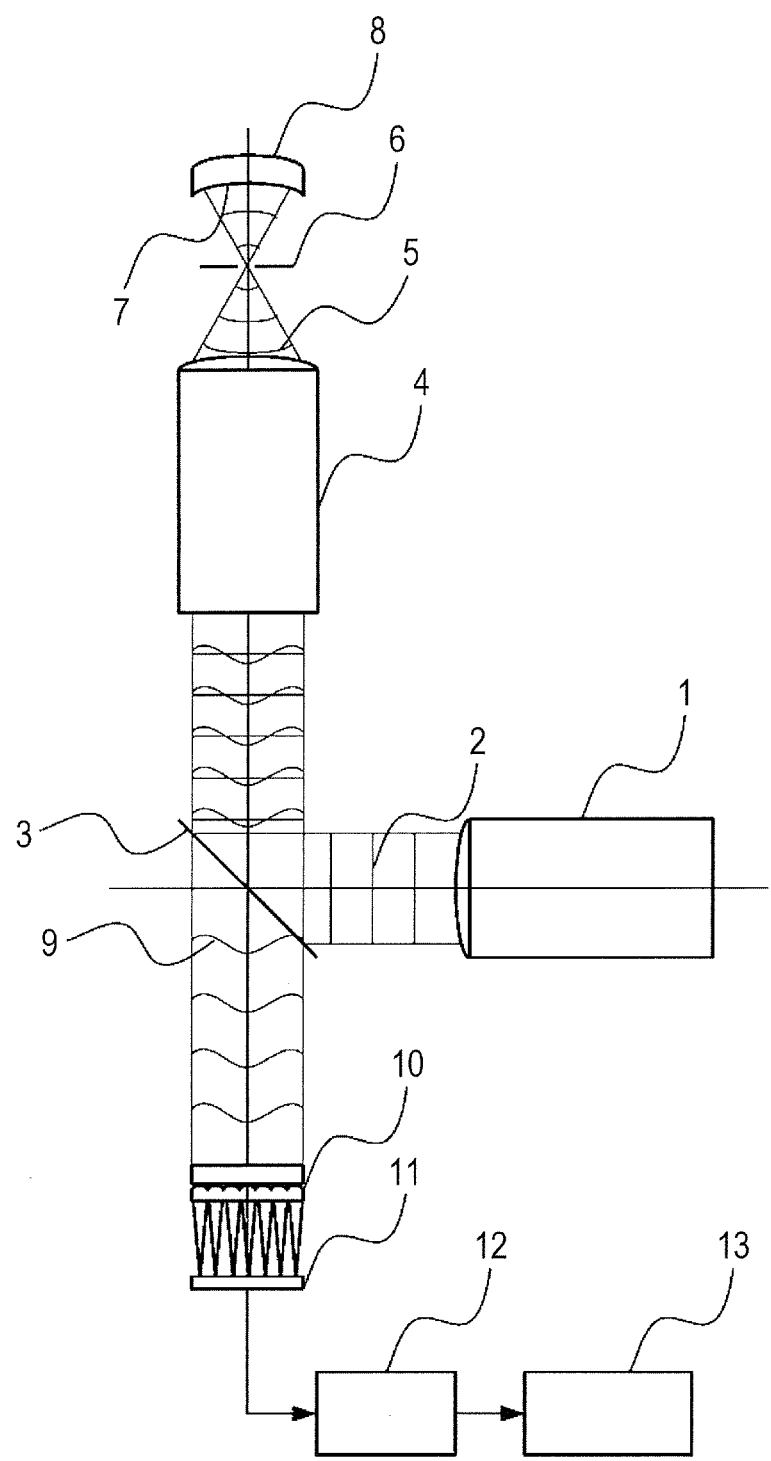
FIG. 12 is an explanatory view illustrating a schematic configuration of a surface shape measuring apparatus as an example of a conventional measuring apparatus.

Further, in the first to third embodiments described above, the separating optical system is the polarization beam splitter 103, but the present invention is not limited thereto. For example, as illustrated in FIG. 11, the separating optical system may include a beam splitter 651 and two linear polarization plates 654 and 655. In this case, it is only necessary that the beam splitter 651 and a beam splitter 652 be arranged instead of the polarization beam splitters 103 and 608 (FIG. 6A) and the linear polarization plates 654 and 655 be arranged instead of the half wavelength plates 604 and 618 (FIG. 6A). The polarizing directions of the linear polarization plates 654 and 655 are set orthogonal to each other. The separating optical system including the beam splitter 651 and the linear polarization plates 654 and 655 can also separate the light emitted from the light source 101 into the measuring light and the reference light, which have polarizing planes orthogonal to each other. In this case, the deflection mirror 611 and the linear polarization plate 110 constitute a reference light optical system 653. The polarizing direction of the linear polarization plate 110 is matched with the polarizing direction of the linear polarization plate 654 installed on the measuring light side.

Further, the separating optical system may include the beam splitter alone. In this case, it is only necessary that the reference light optical system be configured to guide the reference light, which is obtained through the separation by the beam splitter, toward the light output side of the lens array without causing the reference light to pass through the lens array, thereby irradiating the image pickup element with the reference light in the form of collimated light. For example, a half mirror inclined at an angle of 45° may be arranged between the lens array and the image pickup element so that, when the reference light is guided toward the light output side of the lens array in a direction orthogonal to that of the measuring light, the reference light is reflected toward the image pickup element. When the reference light in the form of collimated light is guided to the half mirror, the signal light component of the measuring light passing through the half mirror can interfere with the reference light reflected on the half mirror. In this case, the linear polarization plate 110 may be omitted.

Further, in the first to third embodiments described above, the image pickup element is the CCD image sensor 116, but the present invention is not limited thereto. For example, a CMOS image sensor may be used as the image pickup element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-069563, filed Mar. 26, 2012, which is hereby incorporated by reference herein in its entirety.

What is claimed is:

1. A measuring apparatus, comprising:
a light source for emitting light having a coherence length smaller than an optical path difference between light entering a first optical surface of an object to be measured and light entering a second optical surface of the object to be measured;
a separating optical system for separating the light emitted from the light source into reference light and measuring light that irradiates the object to be measured;
a lens array formed of a plurality of lenses, for condensing, on an image plane, each of the reference light and the measuring light that travels via the object to be measured;
an image pickup element arranged on the image plane;
an adjusting unit for changing at least one object to be adjusted among an optical path length of the measuring light that travels from the light source to the lens array, an optical path length of the reference light that travels from the light source to the lens array, and a wavelength width of the light source, the adjusting unit being configured to change the at least one object to be adjusted so as to include a range in which a signal light component contained in the measuring light that travels via the object to be measured interferes with the reference light; and
a calculating unit for extracting interference light spots generated through interference between the signal light component and the reference light from a plurality of picked-up images acquired sequentially from the image pickup element while changing, by the adjusting unit, the at least one object to be adjusted, calculating positions of the interference light spots, and calculating a shape of the object to be measured based on the positions of the interference light spots and predetermined reference positions.

2. A measuring apparatus according to claim 1, further comprising a linear polarization plate arranged on a light incident side of the lens array so that a polarizing direction thereof becomes orthogonal to a polarizing direction of the reference light and parallel to a polarizing direction of the measuring light, the linear polarization plate comprising a plurality of pinholes formed so as to diffract the reference light therethrough and irradiate the plurality of lenses of the lens array with the diffracted reference light,
wherein the separating optical system is configured to separate the light emitted from the light source into the measuring light and the reference light so that polarizing planes thereof become orthogonal to each other.

3. A measuring apparatus according to claim 2, wherein the separating optical system comprises a polarization beam splitter.

4. A measuring apparatus according to claim 1, wherein the calculating unit is configured to calculate barycenter positions of the interference light spots through use of a part of the interference light spots which has a light intensity exceeding a predetermined threshold value.

5. A measuring method using a measuring apparatus, the measuring apparatus comprising:
a light source for emitting light having a coherence length smaller than an optical path difference between light entering a first optical surface of an object to be measured and light entering a second optical surface of the object to be measured;
a separating optical system for separating the light emitted from the light source into reference light and measuring light that irradiates the object to be measured;
a lens array formed of a plurality of lenses, for condensing, on an image plane, each of the reference light and the measuring light that travels via the object to be measured; and
an image pickup element arranged on the image plane,
the measuring method comprising:
an adjusting process of changing at least one object to be adjusted among an optical path length of the measuring light that travels from the light source to the lens array, an optical path length of the reference light that travels from the light source to the lens array, and a wavelength width of the light source, the at least one object to be adjusted being changed so as to include a range in which a signal light component contained in the measuring light that travels via the object to be measured interferes with the reference light;

an image pickup process of acquiring a plurality of picked-up images sequentially from the image pickup element while changing the at least one object to be adjusted in the adjusting process;

an extracting process of extracting interference light spots generated through interference between the signal light component and the reference light from the plurality of picked-up images; and a calculating process of calculating positions of the interference light spots, and calculating a shape of the object to be measured based on the positions of the interference light spots and predetermined reference positions.

6. A method of manufacturing an optical component, the method comprising:

a production process for the optical component; and an inspection process using a measuring method, wherein the measuring method using a measuring apparatus, the measuring apparatus comprising:

a light source for emitting light having a coherence length smaller than an optical path difference between light entering a first optical surface of an object to be measured and light entering a second optical surface of the object to be measured;

a separating optical system for separating the light emitted from the light source into reference light and measuring light that irradiates the object to be measured;

a lens array formed of a plurality of lenses, for condensing, on an image plane, each of the reference light and the measuring light that travels via the object to be measured; and an image pickup element arranged on the image plane, the measuring method comprising:

an adjusting process of changing at least one object to be adjusted among an optical path length of the measuring light that travels from the light source to the lens array, an optical path length of the reference light that travels from the light source to the lens array, and a wavelength width of the light source, the at least one object to be adjusted being changed so as to include a range in which a signal light component contained in the measuring light that travels via the object to be measured interferes with the reference light;

an image pickup process of acquiring a plurality of picked-up images sequentially from the image pickup element while changing the at least one object to be adjusted in the adjusting process;

an extracting process of extracting interference light spots generated through interference between the signal light component and the reference light from the plurality of picked-up images; and a calculating process of calculating positions of the interference light spots, and calculating a shape of the object to be measured based on the positions of the interference light spots and predetermined reference positions.

* * * * *